US008039721B2

(12) United States Patent
Wold

(10) Patent No.: US 8,039,721 B2
(45) Date of Patent: Oct. 18, 2011

(54) KIT AND METHOD FOR LEARNING TO PLAY AN INSTRUMENT

(76) Inventor: Lisa Wold, Arlington, VA (US)

( * ) Notice: Subject to any disclaimer, the term of this patent is extended or adjusted under 35 U.S.C. 154(b) by 202 days.

(21) Appl. No.: 12/403,873

(22) Filed: Mar. 13, 2009

(65) Prior Publication Data

US 2009/0173212 A1  Jul. 9, 2009

(51) Int. Cl.
*G09B 15/00* (2006.01)
(52) U.S. Cl. ...................................... 84/470 R; 84/483.1
(58) Field of Classification Search ................ 84/470 R, 84/478, 479 A, 483.1, 483.2
See application file for complete search history.

(56) References Cited

U.S. PATENT DOCUMENTS

2010/0005952 A1* 1/2010 LaMon ........................... 84/478
* cited by examiner

*Primary Examiner* — Kimberly Lockett

(57) ABSTRACT

A kit and method for learning rhythms, composing music, to play a musical instrument, and then read music; in that particular order of events. The kit comprises a set of hands on manipulatives that assemble into a structured system of interactive musical instrument concept training components. The method comprises employing the kit according to instructions in at least one or more training manuals to assemble the hands on manipulatives into a structured system of interactive musical instrument concept training components.

18 Claims, 15 Drawing Sheets

FIG. 1

Interval Square 1
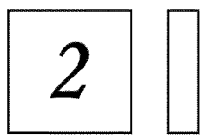

Musical Whole Step 4

Musical Half Step 7

Musical Staff Space 10
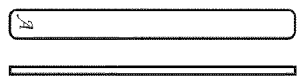

Musical Staff Line 13
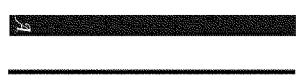

Roman Numeral Block 16
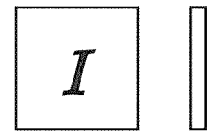

Musical Sharp 19
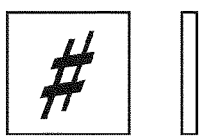

Musical Flat 22

Musical Natural Sign 25
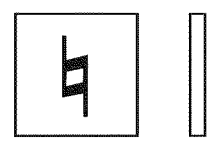

Musical Time Signature Block 28
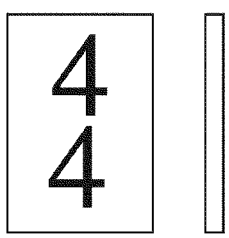

Black Bar Line 31
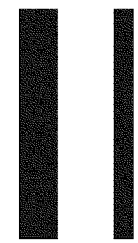

Musical Repeat Sign 34
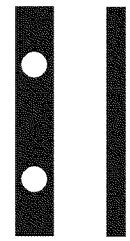

Musical Note 37
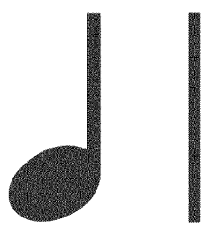

Musical Bass Clef 40

Musical Treble Clef 41

Black Beam 43

Staccato 46

Musical Tie 49

Piano Key White 51
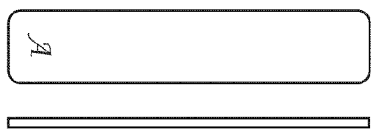

Piano Key Black 52

Circle of Fifths 54
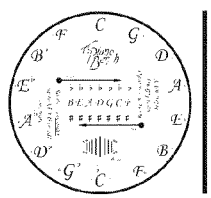

FIG. 13
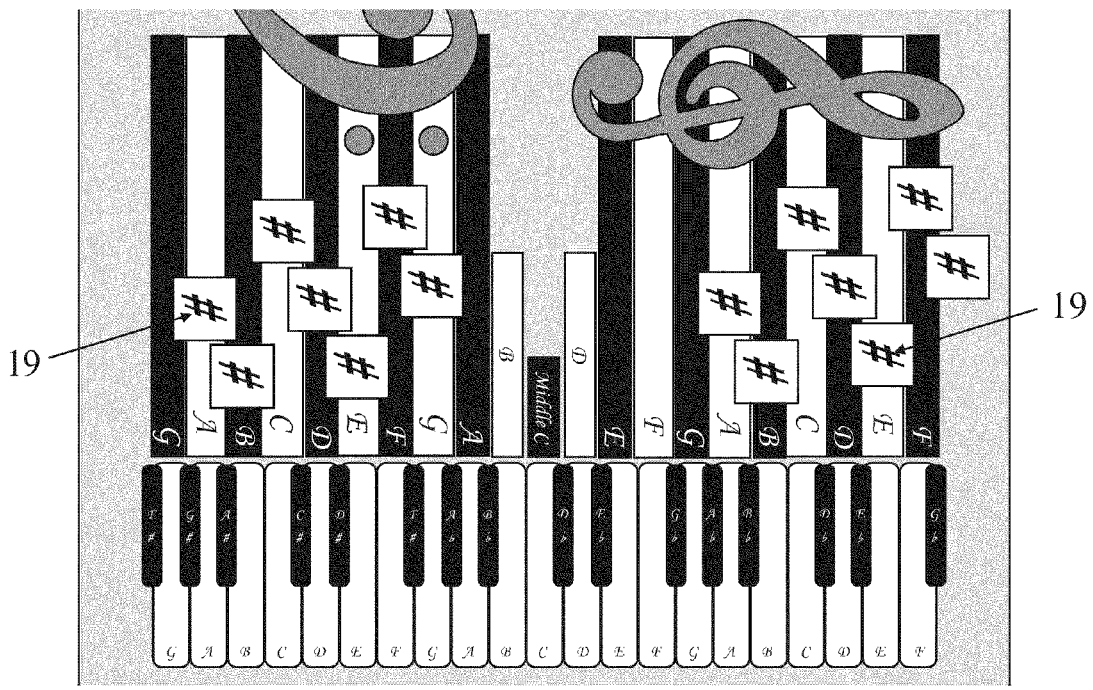
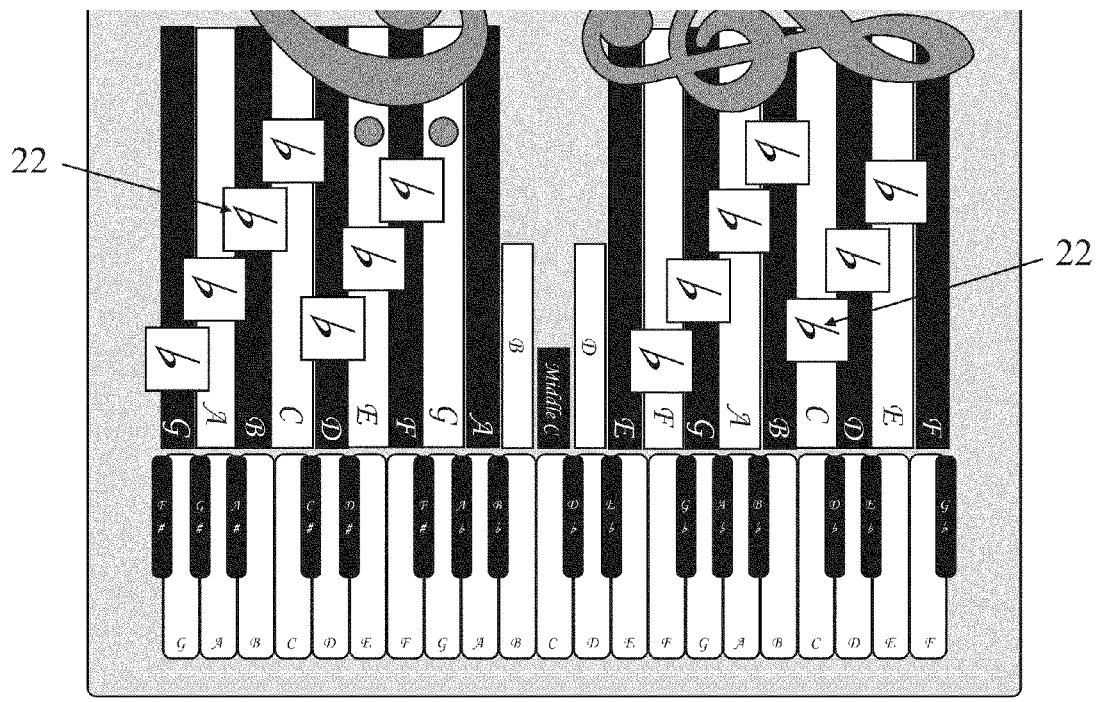

FIG. 18
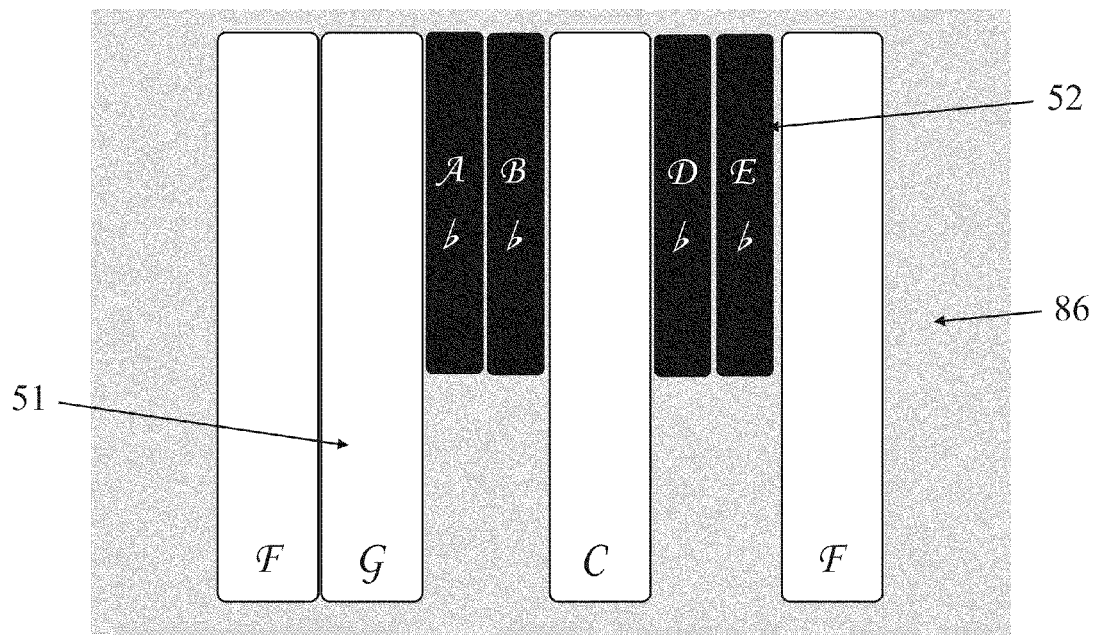
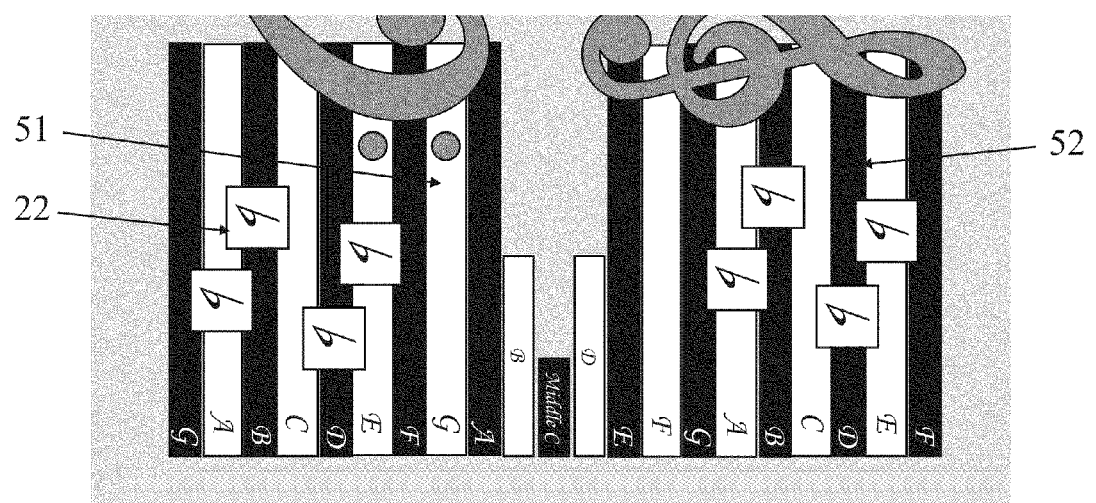

KIT AND METHOD FOR LEARNING TO PLAY AN INSTRUMENT

BACKGROUND OF THE INVENTION

1. Field of the Invention

The present invention relates to a kit and method for learning to read music and play music on an instrument, for example, a kit and method for learning to play piano.

2. Description of Related Art

Music is an art form in which the medium is sound. Elements of music are pitch (which governs melody and harmony), rhythm (and its associated concepts of tempo and meter), articulation (specific ways indicated by the composer in the music in which the sound is to be produced by the performer), dynamics (various levels of loud and soft), and theory (rules which give the melody and harmony structure).

Notation is the written expression of music notes and rhythms on paper using symbols. When music is written down, the pitches and rhythm of the music is notated, along with instructions on how to perform the music. The study of how to read notation involves music theory, harmony, the study of performance practice technique (the best way to physically produce the desired sound or effect desired by the composer), and in some cases an understanding of historical performance practices.

Notated music is produced as sheet music, or assembled in books or collections of pieces. To perform music from notation requires an understanding of both the musical style and the performance practice that is associated with a piece of music or genre. Additionally, performance of music on an instrument requires knowledge of the particular instrument and the ability to coordinate between the process of reading notated music and manipulating the instrument.

Gaining the knowledge and skills required to play music on an instrument is an abstract and practice intensive process. Having an ability to conceptualize abstract concepts of musical theory, such as those concepts discussed above, increases knowledge retention and hastens skill development. It is an object of the present invention to provide a unique approach to teaching a user to play a musical instrument by employing a kit, and method of using the kit, to quantify and solidify abstract musical concepts. The invention simplifies the music reading process by integrating abstract concepts with the use of hands on manipulatives and musical instrument concept training components, which, in conjunction with training manuals fully equip a user of the kit with a thorough knowledge and understanding of all aspects of reading musical notation while fortifying the skills required for playing the musical instrument.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

An instructional kit for assisting a user of the kit to learn to read musical notation comprising a container, having within the container a set of hands on manipulatives. The set of hands on manipulatives assemble into a structured system of interactive musical instrument concept training components according to a set of prepared exercises in at least one or more training manuals.

A method of learning to play a musical instrument. The method comprising employing a kit having a set of hands on manipulatives that assemble into a structured system of interactive musical instrument concept training components according to exercises set forth in at least one or more training manuals. The method further comprising completing an exercise set forth in the at least one or more training manuals to assemble a portion of the set of hands on manipulatives into an interactive musical instrument concept training component. Still further, the method comprising repeating the completion of exercises set forth in the at least one or more training manuals until the structured system of interactive musical instrument concept training components is complete.

BRIEF DESCRIPTION OF THE DRAWINGS

The foregoing and other aspects of the present invention will become apparent to those skilled in the art to which the present invention relates upon reading the following description with reference to the accompanying drawings, in which:

FIG. 1 are perspective views of example hands on manipulatives.

FIG. 13 is a perspective view of "Order of Sharps and Flats Exercise & Component," an example interactive musical instrument concept training component assembled from hands on manipulatives.

FIG. 18 is a perspective view of "Building Minor Scales Exercise & Component," an example interactive musical instrument concept training component assembled from hands on manipulatives.

DETAILED DESCRIPTION OF THE INVENTION

Figure 2:
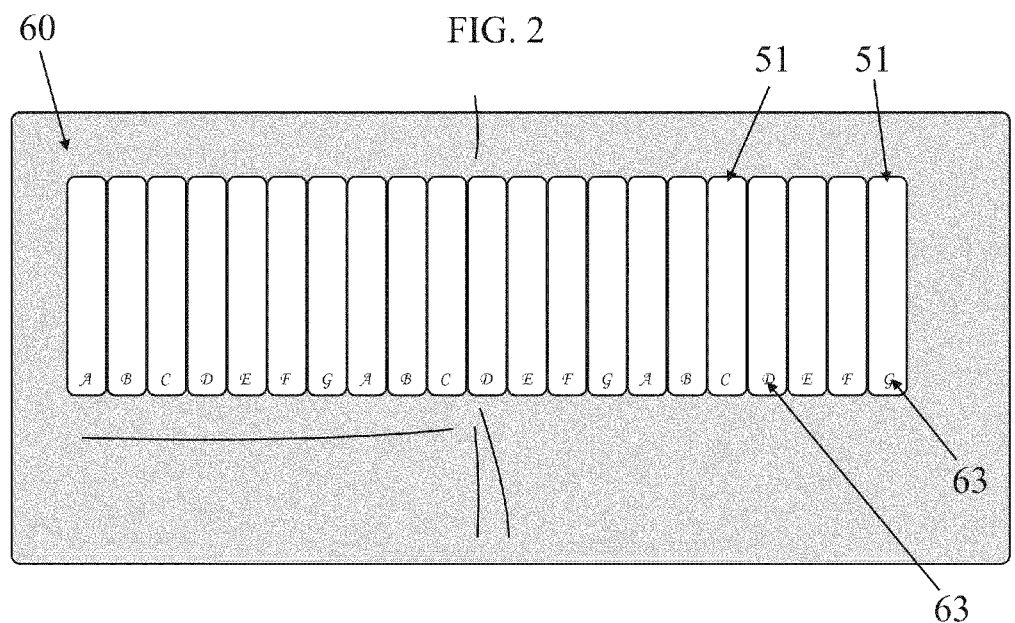
FIG. 2 is a perspective view of "Build the Piano Keys Exercise & Component," an example interactive musical instrument concept training component assembled from hands on manipulatives.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

One aspect of the present invention is an instructional kit for assisting a user of the kit to learn to play a musical instrument. As used herein, "user" refers to anybody that employs the kit or method of the present invention to learn to play a musical instrument, including instructors and students. The kit comprises a container and a set of hands on manipulatives housed in the container. In some embodiments, the kit can also comprise at least one or more training manuals. In one embodiment, the container is a white tin/metal type lunch box 12" wide by 12" deep by 5" high, however it is to be appreciated that the container can be of any dimensions required to house hands on manipulatives therein or be constructed of any material or of any color desired. Additionally, the container may optionally include pockets or other storage bins. In one contemplated embodiment, a pocket can be placed inside the container lid to hold DVD's and/or CD's and two charts the size of a sheet of paper. The container may also be decorated, for example, by placing a logo on the outer surface, such as on the lid.

As used herein, the set of hands on manipulatives refer to the individual pieces in the container. These individual pieces, or manipulatives, are chosen to assist in quantifying and solidifying abstract musical concepts in the mind of the user of the kit and may be made of any appropriate and durable material, such as, for example Sintra®. The manipulatives may also be of varying dimensions, depending on the desires of the end user. In one embodiment, the manipulatives can be, for example, ⅛" thick. As the user manipulates the pieces, they will be able to associate abstract principles with physical phenomena, and thereby more easily, and more enjoyably learn the principles required to play the instrument. For example, the hands on manipulatives can be selected from pieces representing music principles of musical notation, pieces representing parts of the musical instrument to which the kit applies, and pieces for training coordination of the mental and physical processes required to translate musical notation into music when reading musical notation and manipulating the musical instrument.

By way of further example, the hands on manipulatives representing musical principles of music notation are utilized to solidify the general principles required to understand how a musical staff, notes, rhythm symbols and further musical notation principles work together. Some examples of general musical principles of music notation are notes and the staff.

Notes: A note is a tone that has a definite frequency and duration. Note frequencies are designated by the letters "A" through "G." Note symbols (which indicate duration) are provided with the system and method and are arranged and manipulated by the user of the kit and method.

Staff: In standard Western musical notation, the staff is a set of five horizontal lines and four spaces, on which note symbols are placed to indicate their pitch. The pitches indicated by the vertical position of notes on the staff are relative to a fixed pitch that is determined by the placement of a symbol called a clef at the left-hand side of the staff.

The vertical position of the notehead on the staff indicates which note is to be played: notes that are higher in pitch are marked higher up on the staff. The notehead can be placed with the center of its notehead intersecting a line (on a line), or in between the lines touching the lines above and below (in a space). Notes which fall outside the range of the staff are placed on or between ledger lines added above or below the staff.

Which notes are represented by which staff positions is determined by a clef placed at the beginning of the staff; the clef identifies a particular line as a specific note, and all other notes are determined relative to that line. For example, the treble clef puts the G above middle C on the second line. The interval between adjacent staff positions is one step in the diatonic scale. Once fixed by a clef, the notes represented by the positions on the staff can be modified by the key signature, or by accidentals on individual notes.

The system and method provides symbols from which a learner may construct a grand staff from a staff symbol and from bass and treble clef symbols. In addition, the user will learn triads and intervals. A triad is a group of three notes having a specific construction and relationship to one another. They are constructed on three consecutive lines or three consecutive spaces. Each member of the triad is separated by an interval of a third. The triad is composed of a Root, Third, and Fifth. Using symbols of the system and method, the user constructs triads.

An interval is the distance between two notes. Intervals are always counted from the lower note to the higher one, with the lower note being counted as one. Intervals come in different qualities and size. If the notes are sounded successively, it is a melodic interval. If sounded simultaneously, then it is a harmonic interval.

The smallest interval used in Western music is the half step. A visual representation of a half step would be the distance between a consecutive white and black note on the piano. There are two exceptions to this rule, as two natural half steps occur between the notes E and F, and B and C. To convey the concept of notes, the staff, triads, intervals and other concepts of music notation, the manipulatives may be selected from, for example, (FIG. 1) an interval square 1, a musical whole step 4 and half step 7 replica, a musical staff space 10 and line 13, a roman numeral block 16, a block imprinted with a musical sharp 19, flat 22 or natural sign 25, a block imprinted with a musical time signature 28, a black bar line 31, a musical repeat sign 34, a musical note 37, a musical bass 40 or treble clef 41, a black beam 43, a staccato replica 46 or a musical tie replica 49.

Similarly, the manipulatives representing parts of the musical instrument to which the kit applies are utilized to familiarize the user with their chosen musical instrument. These manipulatives can be, for example, a replica of the parts of the subject musical instrument. If for example, the musical instrument to be instructed is a piano, a piece might be a replica piano key (white 51 or black 52), for example, or if the instrument is a saxophone, the piece might be a replica mouth piece, for example.

Associating the parts of the subject musical instrument with the principles of music notation so that the user can actually play music on the instrument takes further practice. As such, the kit includes manipulatives for training coordination of the mental and physical processes required to translate musical notation into music when reading musical notation and manipulating the musical instrument. For example, a user must learn to read meter and keep beat. Meter is the regular recurring pattern of strong and weak beats of equal duration; also known as time. The meter or time signature in a musical composition is indicated by a fraction, and located at the beginning of a piece of music. The lower number of the fraction tells what kind of note receives one beat. The upper number tells how many beats are in a measure.

An example manipulative to learn meter is a ball, such as a racquet ball. A user is provided with a ball, which the user bounces in time with a metronome to learn musical timing. Further manipulatives can be, for example, a circle of fifths 54, a game board or a set of white gloves. In music theory, the circle of fifths shows the relationships among the twelve tones of the chromatic scale, their corresponding key signatures, and the associated major and minor keys. More generally, it is a geometrical representation of relationships among the 12 pitch classes of the chromatic scale in pitch class space. Musicians and composers use the circle of fifths to understand and describe those relationships.

The hands on manipulatives are chosen so that they will assemble into a structured system of interactive musical instrument concept training components according to a set of prepared exercises in at least one or more training manuals. The training manuals set forth a number of exercises that entail combining the manipulatives. Upon completion of an exercise, the user will have assembled an interactive musical instrument concept training component from the manipulatives. Examples of these components are set forth below. The hands on manipulatives coincide with the exercises in the training manual such that the various interactive musical instrument concept training components that are constructed form a structured system by which the user learns to play the instrument.

Some examples of interactive musical instrument concept training components are 1) sight reading components, such as, for example, a staff with notes, 2) musical instrument recognition components, such as, for example, a replica piano keyboard having note letters associated with the keys, and 3) coordination practicing components, such as, for example, a racquet ball and metronome. Further examples are provided below for an example embodiment.

A further object of the present invention is directed to a method of learning to play a musical instrument employing a musical instrument instruction kit. The method comprises employing the kit according to instructions in a training manual. Individual exercises are completed to construct interactive musical instrument concept training components from a set of hands on manipulatives. As further exercises are completed, a system of structured interactive musical instrument concept training components is formed. The user continues to complete exercises until the structured system is complete. Of course, it is contemplated that the structured system could be completed with one exercise.

In one aspect of the present invention, it is contemplated that the method will encompass 1) teaching sight reading, 2) teaching musical instrument recognition, and 3) coordination training. Coordination training includes training the user to associate the physical processes of playing the instrument with the mental processes required for note reading, as well as training the body of the user to become proficient in the physical processes required in playing the instrument.

In another aspect of the present invention, by following exercises in at least one or more training manuals to construct interactive musical instrument concept training components from a set of hands on manipulatives, the method simultaneously serves to teach a user of the method to sight read musical notation and associate the musical notation with parts of the musical instrument, train the user to count musical rhythm notation and recognize the temporal relation between said musical rhythm notation and length of time to play a note on the musical instrument, train the user to understand how scales and intervals are built and recognize sharps and flats on a musical scale, train the user to understand how intervals and chords are built, train the user to be able to identify a particular sound with a particular interval and anticipate what sound will be next without needing to hear that next sound first, and train the user to create and notate a piece of music.

Among other things, the method of using the kit of the present invention will teach a user of the kit sight reading, rhythm (notation and counting), half steps and whole steps, intervals, ear training and composition. The present invention is contemplated to assist a user to learn to play wind instruments, string instruments, percussion instruments, electronic instruments, keyboard instruments or any other type of instrument. Wind instruments, such as, for example a, Bansuri, Danso, Dizi, Duduk, Didgeridoo, Diple, Fife, Flabiol, Flageolet, Fujara, Gemshorn, Hocchiku, Hun, Irish flute, Inci, Kaval, Khloy, Khlui, Koudi, Nadaswaram, Ney, Nohkan, Nose flute, Ocarina, Organ pipe, Paixiao, Palendag, Pan pipes, Pasiyak, Water whistle, Pulalu, Piano horn, Quena, Recorder, Ryuteki, Samponia, Shakuhachi, Shinobue, Shvi, Siku, Slide whistle, Suling, Tin Whistle, Tonette, Tumpong, Veena, Vertical flute, Washint, Piccolo, Flute, Alto flute, Bass flute, Contra-alto flute, Contrabass flute, Subcontrabass flute, Double contrabass flute, Hyperbass flute, Whistle, Willow flute, Xiao, Xun Zufolo, Alboka, Arghul, Chalumeau, Clarinets, Clarinet, Piccolo clarinet, Sopranino clarinet, Soprano clarinet, Saxonette, Basset clarinet, Clarinette d'amour, Basset horn, Alto clarinet, Bass clarinet, Contra-alto clarinet, Contrabass clarinet, Octocontra-alto clarinet, Octocontrabass clarinet, Launeddas, Mijwiz, Octavin, Pibgorn, Saxophone, Soprillo, Sopranino saxophone, C Soprano saxophone, Soprano saxophone, Mezzo-soprano saxophone, Alto saxophone, C melody saxophone, Tenor saxophone, Baritone saxophone, Bass saxophone, Contrabass saxophone, Subcontrabass saxophone, Tubax, Tarogato, Folgerphone, Bassoon, Contrabassoon/Double bassoon, Tenoroon, Bifora, Bombarde, Cromorne, Crumhorn, Dulzaina, Dulcian, Guan, Heckelphone, Piccolo heckelphone, Terz heckelphone, Ken bau, Nadaswaram, Oboe, Piccolo oboe, Oboe d'amore, Cor anglais/English horn, Oboe da caccia, Bass/Baritone oboe, Contrabass oboe, Rackett, Contrabass á anche/Reed contrabass, Sarrusophone, Sopranino sarrusophone, Soprano sarrusophone, Alto sarrusophone, Tenor sarrusophone, Baritone sarrusophone, Bass sarrusophone, Contrabass sarrusophone, Shawm, Sralai, Suona, Surnay, Tarogato, Trompeta china, Tromboon, Bagpipes, Air horn, Alphorn, Baritone horn, Bazooka, Bugle keyed bugle, Cimbasso, Conch, Cornet, Cornett, Didgeridoo, Doulophone/Cuprophone, Euphonium, Flugelhorn, Horagai, Horn/French horn, Jug, Mellophone, Ophicleide, Roman tuba, Sackbut, Saxhorn, Subcontrabass tuba, Serpent, Shofar, Sousaphone, Tenor Horn/Alto Horn, Trombone, Trumpet, Tuba, Wagner tuba, Quinticlave, Accordion, Chromatic Accordion, Button Accordion, Free Bass Accordion, Array mbira, Agidigbo, Bandoneón, Bawu, Bayan, Comb, Concertina, Electric thumb piano, Harmonica, Harmonium, Jew's Harp, Kalimba, Khene, Kisanji, Kouxian, Likembe, Lusheng, Mangtong, Melodica, Melodeon, Mbira, Morsing, Musete, Musical box, Pipe organ, Saenghwang, Sanza, Sheng, Thumb piano, Tom, Yu, Bullroarer, Harmonica, Lasso d'amore, Whip, Siren. String instruments, such as, for example a, Aeolian harp, Ajaeng, Appalachian dulcimer, Archlute, Arpeggione, Baglama, Balalaika, Bandura, Banjo, Barbat, Baryton, Berimbau, Biwa, Bordonua, Bouzouki, Cello, Chapman stick, Charango, Cimbalom, Electric Cymbalum, Cittern, Clavichord, Crwth, Cuatro, Dahu, Đàn bầu, Đàn gáo, Đàn nguyệt, Đàn tam thập lục, Đàn tranh, Đàn tỳ bà, Dihu, Domra, Double-neck guitjo, Double Bass, Dutar, Duxianqin, Ektara, Erhu, Erxian, Faglong/Fuglung, Fegereng, Fiddle, Fortepiano or Pianoforte, Gayageum, Guzheng, Gehu, Geomungo, Gottuvadhyam, Guitar, Acoustic bass guitar, Acoustic guitar, Bass guitar, Chitarra battente, Cigar box guitar, Classical guitar, Electric guitar, Flamenco guitar, Harp guitar, Seven-string guitar, Slide guitar, Ukulele, Steel guitar, Tailed bridge guitar, 3rd bridge guitar, Guitarrón, Gusli, Guqin, Guzheng, Hammered dulcimer, Hardanger fiddle, Harmonico, Harp, Harpsichord, Hegelong, Huluhu, Huqin, Hurdy gurdy, Igil, Irish bouzouki, Jiaohu, Kadlong, Kamancha, Kantele, Khim, Kokyu, Komungo, Kora, Koto, Kubing, Kudyapi, Langeleik, Laruan, Leiqin, Lirone, Lute, Lyre, Maguhu, Mando-bass, Mandocello, Mandola, Mandolin, Mohan veena, Morin khuur, Musical bow, Nyckelharpa, Octave mandolin, Octobass, Oud, Piano, Piccolo violin, Piccolo 'cello/violoncello piccolo, Pipa, Psaltery, Quatro, Rebab, Rebec, Ruan, Rudra vina, Sallameh, Sanshin, Santoor, Sanxian, Saung, Saw sam sai, Saz, Se, Shamisen, Setar, Sitar, Stroh violin, Sopranino mandolin, Tamburitza, Tamboori or Tanpura, Tar, Tea chest bass, Tenor viola, Theorbo, Timple, Tres, Tro, Trumpet marine/tromba marina, Tuhu, Ukulele, Valiha, Veena, Vertical viola, Vichitra vina, Vielle, Vihuela, Viol, Viola da gamba, Viola, Viola d'amore, Violin, Violotta, Washtub bass, Xalam/Khalam, Yayli tanbur, Yazheng, Yang Qin, Zhonghu, Zhuihu, Zither, Overtone zither. Percussion instruments, such as, for example a, Drum, Abïa drum, African drum, Agung a Tamlang, Bass drum, Bodhrán, Bongo drum, Chenda, Conga, Cuíca, Dabakan, Dhol, Dholak, Djembe, Drum Kit, Goblet drum, Janggu, Kettle drum, Kendang, Khol, Lambeg drum, Maadal, Mridangam, Naqara, Octaban, Sabar, Sampho, Snare, Steel drum, Surdo, Tabla, Taiko, O Daiko, Tan-tan, Talking drum, Taphon, Thavil, Timpani, Tom-Tom, Agogo, Agung/Agong, Agung a Tamlang, Ahoko, Array mbira, Babendil, Bell, Bianqing, Bianzhong, Bones, Boomwhackers, Carillon, Castanets, Caxixi, Chime, Ching, Clapper, Claves, Cowbell, Crotales, Crash cymbal, Hi-hat cymbal, Ride cymbal, Splash cymbal, Zil, Cymbalum, Fangxiang, Gamelan, American gamelan, Gangsa, Gender, Ugal, Gandingan, Gandingan a Kayo, Ganzá, Ghatam, Glass marimba, Glass harmonica, Glockenspiel, Gong, Guban, Guiro, Handbells, Hang, Hosho, Ipu, Kagul, Kalimba, Kulintang a Kayo, Kulintang a Tiniok, Lamellaphone, Luntang, Maracas, Marimba, Marimbaphone, Mbira, Metallophone, Musical Saw, Rainstick, Ranat ek lek, Ranat thum lek, Ratchet, Rattle, Riq, Shekere, Singing bowl, Slit Drum, Spoons, Steelpan, Tambourine, Triangle, Trychel, Timpani, Tubular bells, Udu, Vibraphone, Washboard, Xylophone, Xylorimba. Electronic instruments such as, for example a, Computer, Continuum, Denis d'or, Dubreq Stylophone, Drum machine, Electric guitar, Electronic organ, Electronic organ—synthesizer hybrid, Electric piano, Fingerboard synthesizer, Hammond organ, laser harp, Mellotron, Octapad, Ondes Martenot, Turntables, Rhodes piano, Sampler, Synclavier, Synthesizer, Teleharmonium, tenori-on, Theremin. Keyboard instruments such as, for example a, Bandoneón, Calliope, Carillon, Celesta, Clavichord, Clavinet, Glasschord, Harpsichord, Katzenklavier, Keytar, MIDI keyboard, Organ, Electronic organ, Hammond Organ, Pipe organ, Piano, Baby grand piano, Electric piano, Grand piano, Janko piano, Mechanical Piano, Honky Tonk, Thumb piano, Toy piano, Upright piano, Upright grand piano, Viola organista. Other instruments such as, for example a, Crystallophone, Hardart, Hydraulophone, Plasmaphone, Pyrophone, Quintephone, Sea organ, Shishi odoshi, Suikinkutsu or a Wobble board. While a number of instruments for which the present invention can be employed to teach have been described, it is to be appreciated that the instruments set forth are merely examples. The present method and kit can be employed to teach any instrument that can be used to produce music.

In one example embodiment, the kit is employed to instruct a user to play piano. In such an embodiment, the kit can contain a set of hands on manipulatives that may be assembled into a structured system of interactive musical instrument concept training according to the following exercises, included in at least one or more training manuals.

Build the Piano Keys Exercise & Component (FIG. 2): In an example of a musical instrument recognition exercise and component, the user builds an interactive musical instrument concept component by placing white key manipulatives 51, having letters denoting pitch 63 thereon, on a green board 60 to show a piano keyboard in musical-alphabetical order.

Figure 3:
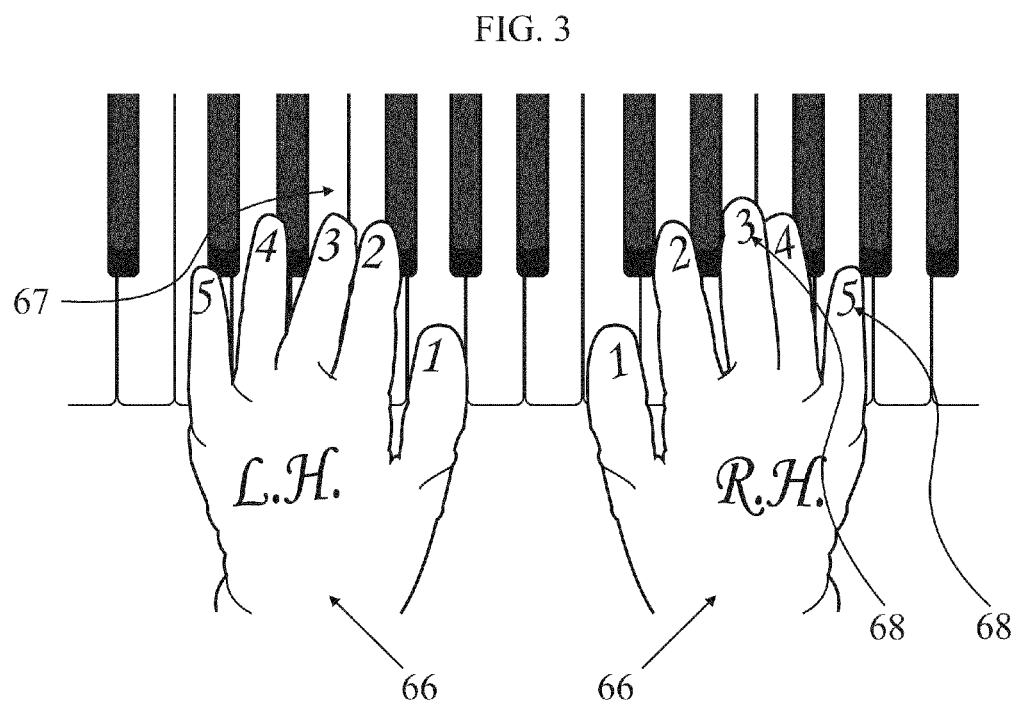
FIG. 3 is a perspective view of "Gloves Exercise & Component," an example interactive musical instrument concept training component assembled from hands on manipulatives.

Gloves Exercise & Component (FIG. 3): The user using a marker draws RH (for right hand) and LH (for left hand) on gloves 66, and numbers 68 the fingers on each glove using the marker. By marking and using the gloves 66 in the exercise according to instructions spelled out in the manual the user learns the relationship of finger numbers of the right hand to the finger numbers of the left hand. With the gloves 66 on and with both hands placed on actual piano keys 67 the user can see that the lowest finger in each hand is numbered 68 differently, with the one exception being the middle finger number three. The third fingers are the only fingers that are in the same place in each hand.

Figure 4A:
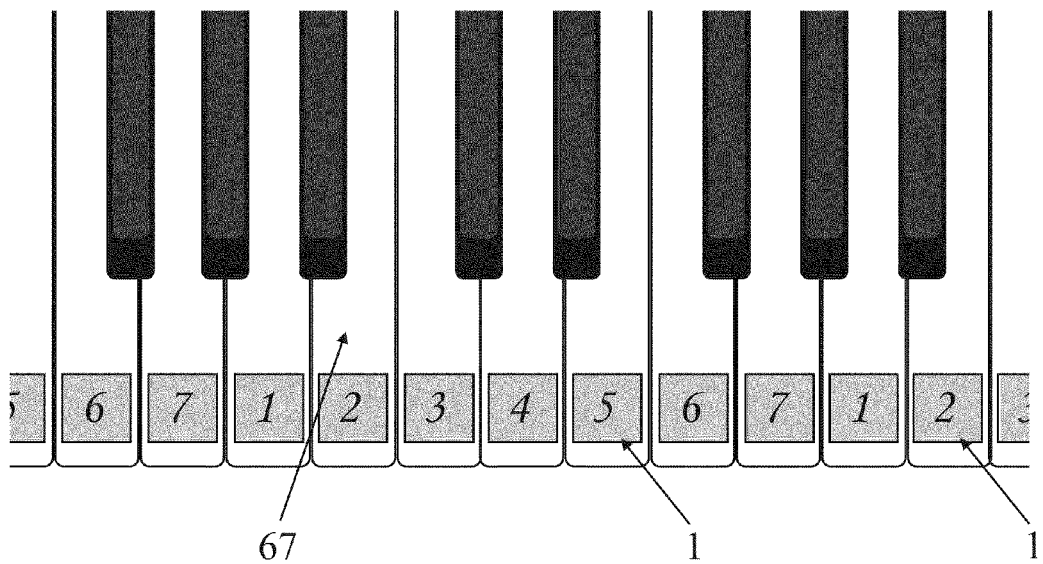
FIG. 4A is a perspective view of "Colorful Keys Exercise & Component," an example interactive musical instrument concept training component assembled from hands on manipulatives.

Colorful Keys Exercise & Component (FIG. 4A): The user is reinforcing the concept of how the musical alphabet is spelled out on the white piano keys 67 by placing colored interval squares 1 on actual piano keys 67. The user places yellow interval square manipulatives on all the A's; blue interval squares on all the B's; orange interval squares on all the C's; purple interval squares on all the D's; red interval squares on all the E's; brown interval squares on all the F's; and green interval squares on all the G's. By doing this the user can see clearly that all the same alphabetical keys look the same.

Figure 4B:
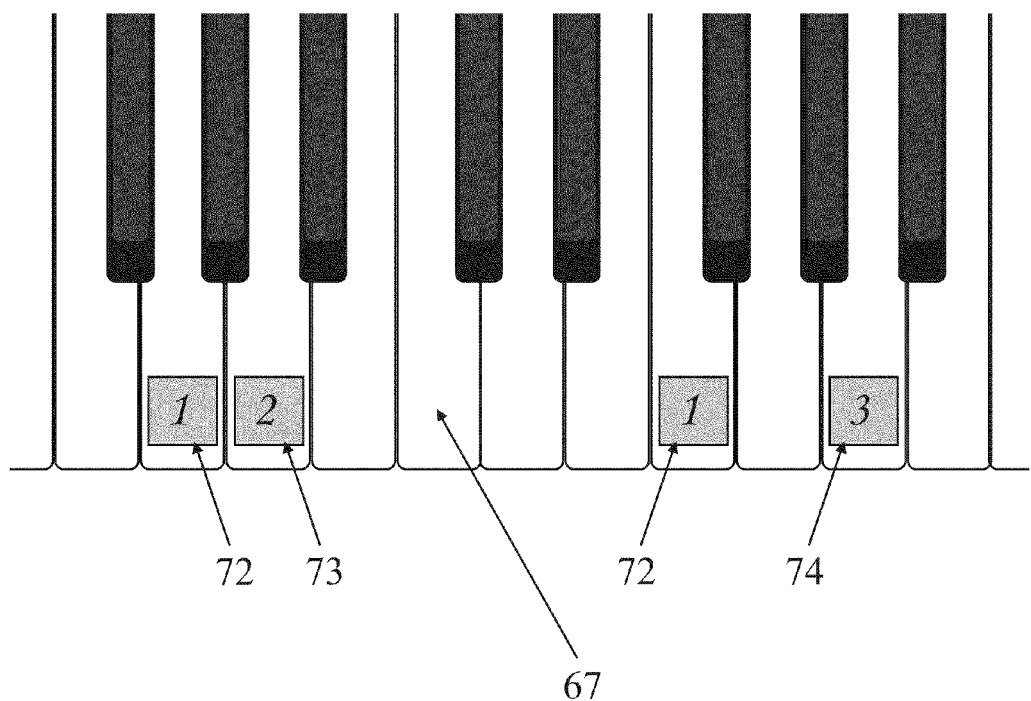
FIG. 4B is a perspective view of "Colorful Stepping and Skipping Exercise & Component," an example interactive musical instrument concept training component assembled from hands on manipulatives.

Stepping and Skipping Exercise & Component (FIG. 4B): The user, placing yellow 72, blue 73, and orange interval squares 74 on the user's actual piano keys 67, learns steps and skips. The yellow square represents the starting first key from which the interval (distance between two keys) is measured. The blue square is placed on the next key (a second or a step). The orange square is placed on a key two keys away from the yellow one (a third or skip).

Figure 5:
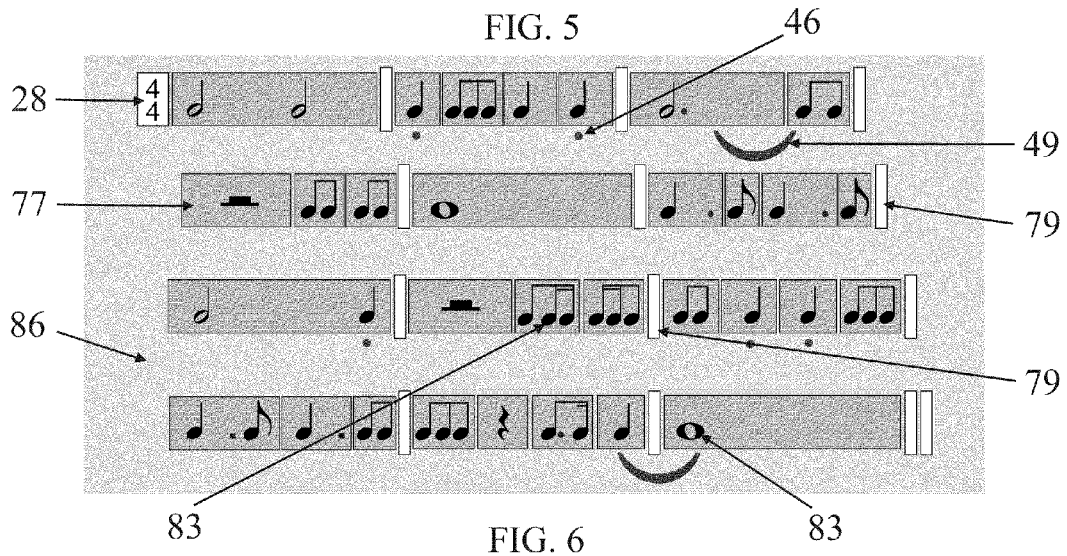
FIG. 5 is a perspective view of "Rhythm Building Exercise & Component," an example interactive musical instrument concept training component assembled from hands on manipulatives.

Rhythm Building Exercise & Component (FIG. 5): The user uses rhythm card manipulatives 77 having thereon notes 83 representing various rhythms and bar lines 79, along with tie manipulatives 49, staccato manipulatives 46 and a time signature 28 to build measures of various rhythms on the gray board 86. In doing this the user learns how note values relate to each other in a mathematical way.

Figure 6:
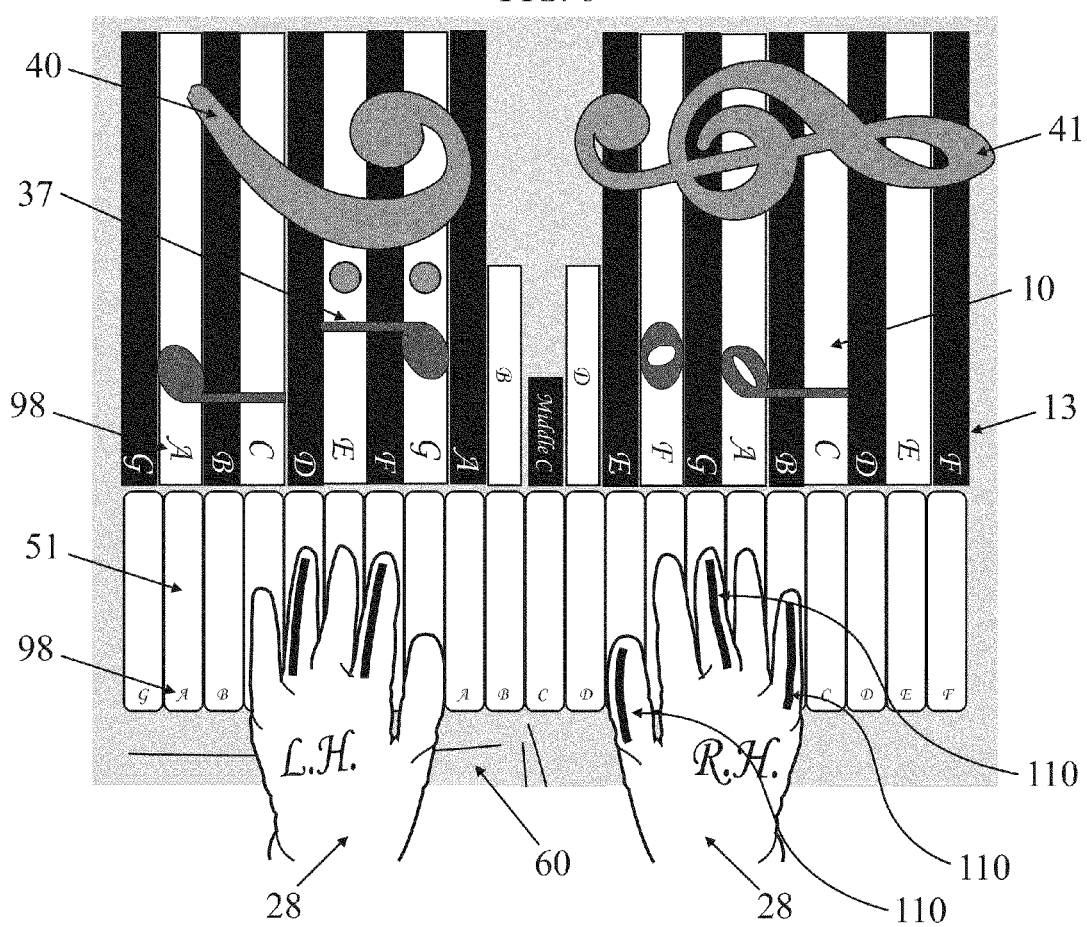
FIG. 6 is a perspective view of "Staff and Keys Exercise & Component," an example interactive musical instrument concept training component assembled from hands on manipulatives.

Staff and Keys Exercise & Component (FIG. 6): In an example of a sight reading exercise and component, the user learns how reading music relates to the piano keys by building white piano key manipulatives 51 and the Grand Staff with Grand Staff line 13 and space 10 manipulatives on a green board 60 manipulative. The lines 13, spaces 10, and keys 51 each have thereon pitch indications 98, and are aligned accordingly. In doing this the user can literally see how the lines 13 and spaces 10 in the staff line up with the white piano keys 51, and when a note is placed on a line 13 or space 10 the piano key 51 that is to be pressed lines up with that particular line 13 or space 10 on the grand staff. First, the user positions the white keys 51 on the green board 51. Then he takes the bass clef symbol 40 manipulatives and lines up the spaces 10 and lines 13 with the corresponding keys 51 on the keyboard he just built. Then he does the same thing with the treble clef symbol 41 manipulatives. Using the labeled gloves 107 with lines drawn on every other finger 110, the user learns the relationship of fingers to the staff, and then to keys on an actual piano. The user then places note 37 manipulatives (quarter notes, whole notes, half notes) on the lines 13 or spaces 10 on the Grand Staff on the green board 60. In doing this he learns to see that the position of the note 37 on the staff correlates with the white key 51. He then can see that that is the key to be played. By visually lining up the white keys 51 (with gloves 107 on) to the note 37 on the staff the user can visually see the connection, therefore learning how to read notation much easier than in traditional methods where notation is just notes on a staff on a piece of paper. This method takes the abstract concept of note reading and makes it concrete.

Figure 7:
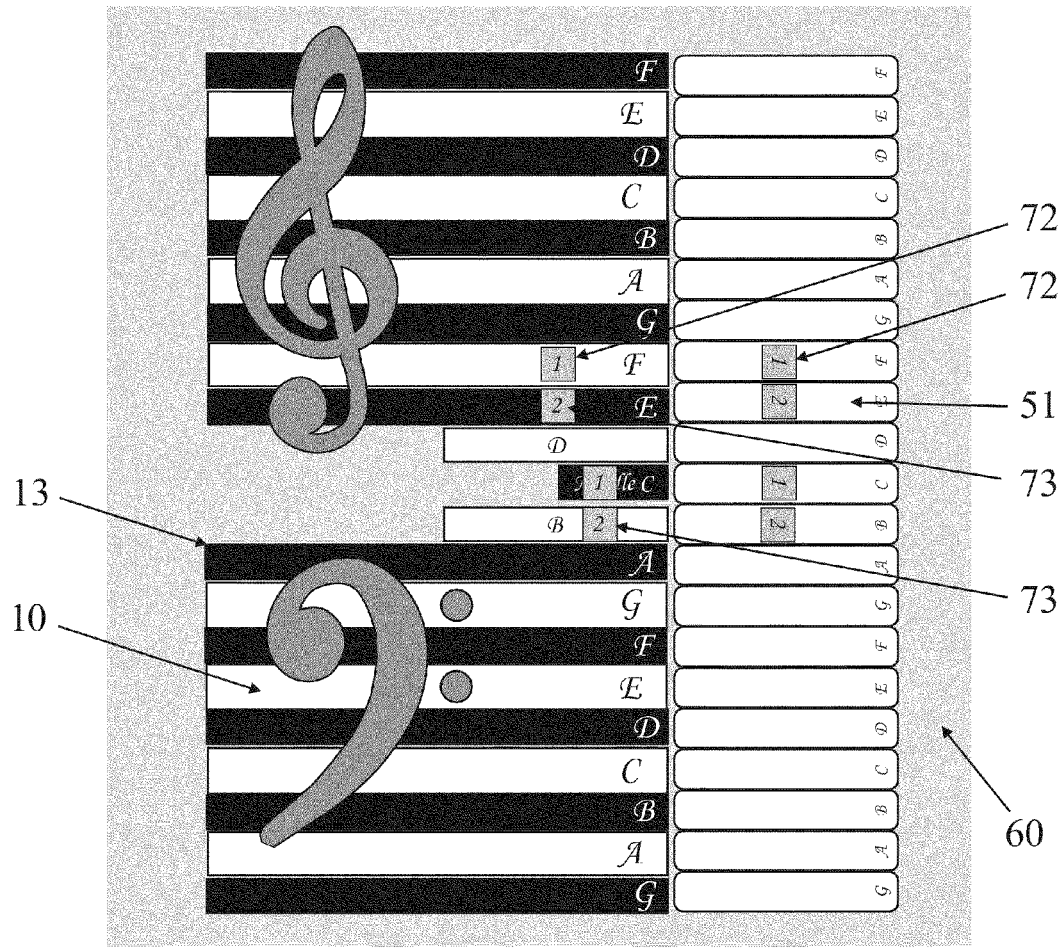
FIG. 7 is a perspective view of "Playing with Intervals Exercise & Component," an example interactive musical instrument concept training component assembled from hands on manipulatives.

Playing with Intervals Exercise & Component (FIG. 7): The user learns seven different intervals, and how intervals are recognized in music notation. An interval is the measured distance between two keys on the piano. For each exercise or example the user sets up the Grand Staff and White Keys on the green board (similar to Staff and Keys Exercise & Component). Then he places a yellow interval square 72 (with the number 1 on it) on any white key 51. Then he places a blue interval square 73 (with the number 2 on it) on an adjacent white key 51. The distance between the two adjacent keys is compromised of TWO KEYS; therefore the distance is a SECOND. Then the user places a yellow 72 and blue interval square 73 on the adjacent lines 13 or spaces 10 on the staff (which is next to and lined up to the white keys 51 on the green board 60). The user can see visually that adjacent lines 13 and spaces 10 are SECONDS. Then the user places the yellow 72 and blue interval squares 73 on the real piano in the same way he did it on the white keys on the green board. By doing this he can hear what an interval such a SECOND sounds like. Also, by doing this exercise the user is learning how to build intervals, recognize intervals, and sing intervals.

To learn THIRDS the user uses yellow interval squares in the same way he did for SECONDS. He uses the orange squares (with a number 3) to build THIRDS. A THIRD consists of two white keys with one white key in between. (* Note: All intervals are found in both white and black keys, but the concept is taught in this invention at first on white keys alone) A THIRD on the staff consists of two adjacent lines with a space in between, or two adjacent spaces with a line in between. The user can see that on the mat the interval squares on the Grand Staff line up with the interval squares on the white keys.

To learn FOURTHS the user uses yellow and purple (with a number 4) interval squares as described in the previous example. On the keyboard a FOURTH consists of two white keys with two keys in between them. A FOURTH on the staff consists on a line and a space with only one line and one space in between them.

To learns FIFTHS by using yellow and red (with the number 5) interval squares as described in the previous examples. On the keyboard a FIFTH consists of two white keys with three keys in between them. On the staff a FIFTH consists of two lines with one line in between them, or two spaces with one space in between them.

To learns SIXTHS by using yellow and brown (with the number 6) interval squares as described in the previous examples. On the keyboard a SIXTH consists of two white keys with four white keys in between them. On the staff a SIXTH consists of a line and space with two lines and two spaces in between them.

To learn SEVENTHS by using yellow and green (with the number 7) interval squares as described in the previous examples. On the keyboard a SEVENTH consists of two white keys with five white keys in between. On the staff a SEVENTH consists of two lines with two lines in between them, or two spaces with two spaces in between them.

To learn OCTAVES by using the white octave squares (with the number 8). On the keyboard an octave consists of two white keys with six white keys in between them. Both keys have the same musical alphabet letter (Ex: C to the next C, or D to the next D). The user places two octave squares on two white keys with the same letter. Then he places two additional octave squares on the corresponding line and spaces on the staff. An octave on the staff consists of a line and space with three lines and three spaces in between them.

Figure 8:
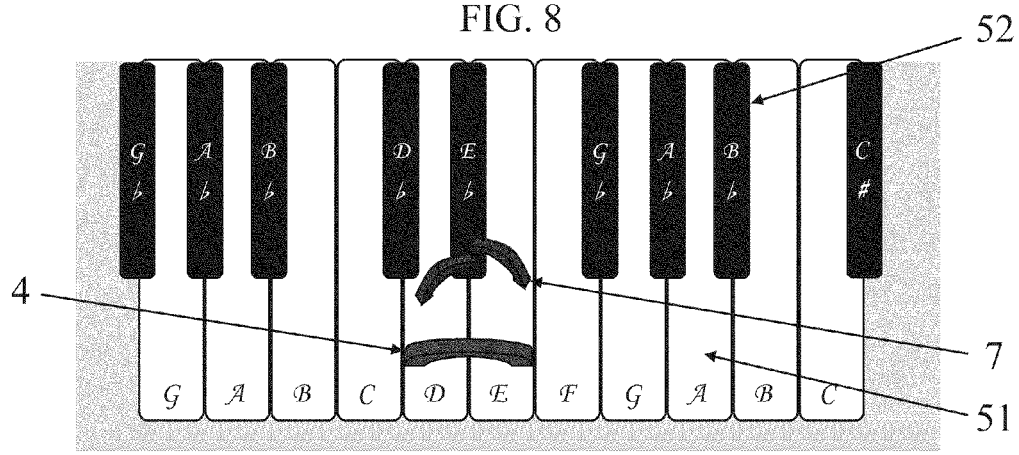
FIG. 8 is a perspective view of "Half Steps and Whole Steps Exercise & Component," an example interactive musical instrument concept training component assembled from hands on manipulatives.

Half Steps and Whole Steps Exercise & Component (FIG. 8): The user uses blue half step 7 and whole step manipulatives 4 to learn how to build perfect fourths, fifths, and octaves; and major and minor seconds, thirds, and sixths. The user first sets up the white 51 and black keys 52 and the Grand Staff on the green mat. Then he places the blue half step objects on adjacent keys on the keyboard without a key in between. Then he places the blue whole step objects 4 over the two blue half step 7 manipulatives. By doing this the user can build, and visually see what half and whole steps are.

Figure 9:
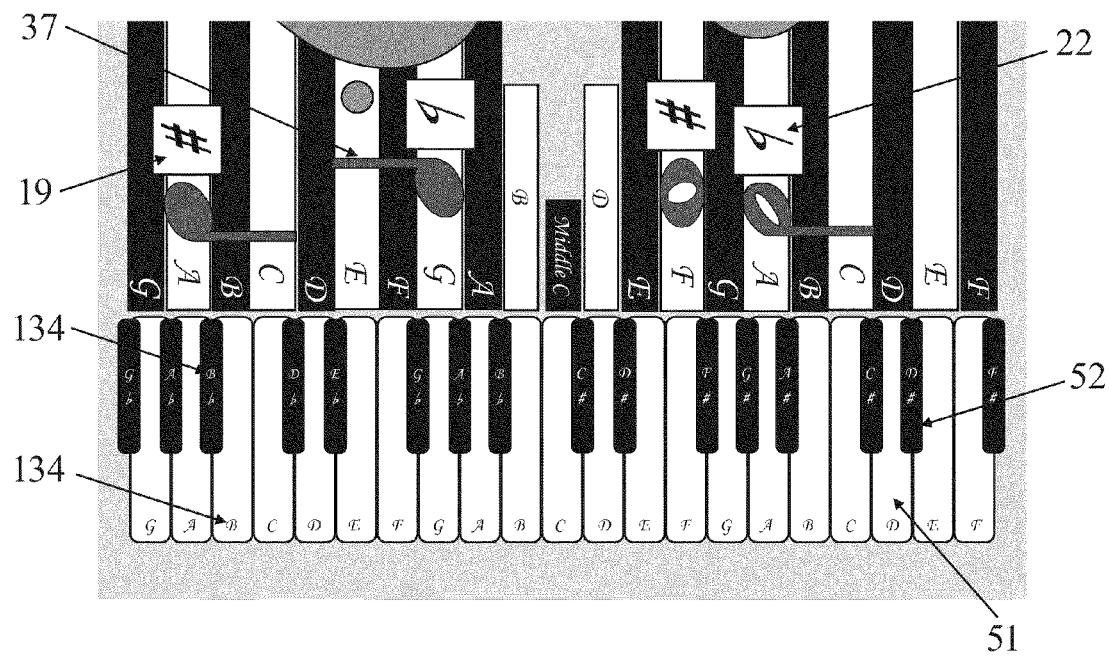
FIG. 9 is a perspective view of "Sharps and Flats Exercise & Component," an example interactive musical instrument concept training component assembled from hands on manipulatives.

Sharps and Flats Exercise & Component (FIG. 9): The user learns the concept of what sharps and flats are in notation using the Grand Staff and white keys set up on the green board (similar to Staff and Keys Exercise & Component), short black keys 52, sharp 19 and flat 22 blocks, and rhythm note 37 manipulatives. First he places the black keys 52 a half step above the white keys 51 (this positions the black keys 52 in between the white keys 51, thus forming the complete keyboard). Each black key 52 has a letter 134 on it that matches the white key 51 just to the right of it, and a sharp 19 drawn beside it. He can see that the black keys 52 are sharps. Then he turns the black keys 52 over and sees that they have a letter on it that matches the white key 51 just to the left of it, and a flat drawn beside it (also learning that sharps are half steps going up, and flats are half steps going down). Then the user places rhythmic note 37 shapes of whole notes, quarter notes, and half notes on the staff with a sharp 19 or flat 22 rectangle in front of it. He then plays that particular white key that lines up with it on the real piano.

Figure 10:
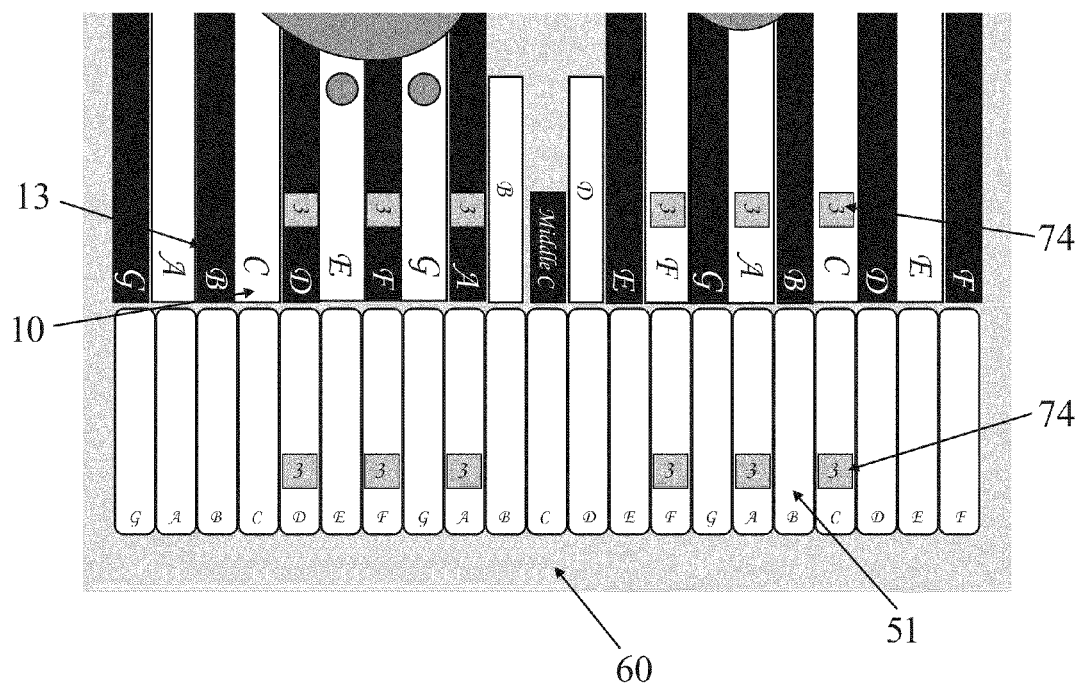
FIG. 10 is a perspective view of "Triad Building Exercise & Component," an example interactive musical instrument concept training component assembled from hands on manipulatives.

Triad Building Exercise & Component (FIG. 10): The user learns how to build and play triads. Triads are chords consisting of three notes, each a third apart. First the user sets up the Grand Staff and White Keys 51 on the green board 60 (similar to Staff and Keys Exercise & Component). Then the user places three orange interval squares 74 in THIRDS (as learned in the "Playing with Intervals Exercise & Component") on the white keys 51. Then he places three more orange interval squares 51 on the corresponding lines 13 and spaces 10 on the staff. He does this in several locations, and then plays the same white keys on the real piano.

Figure 11:
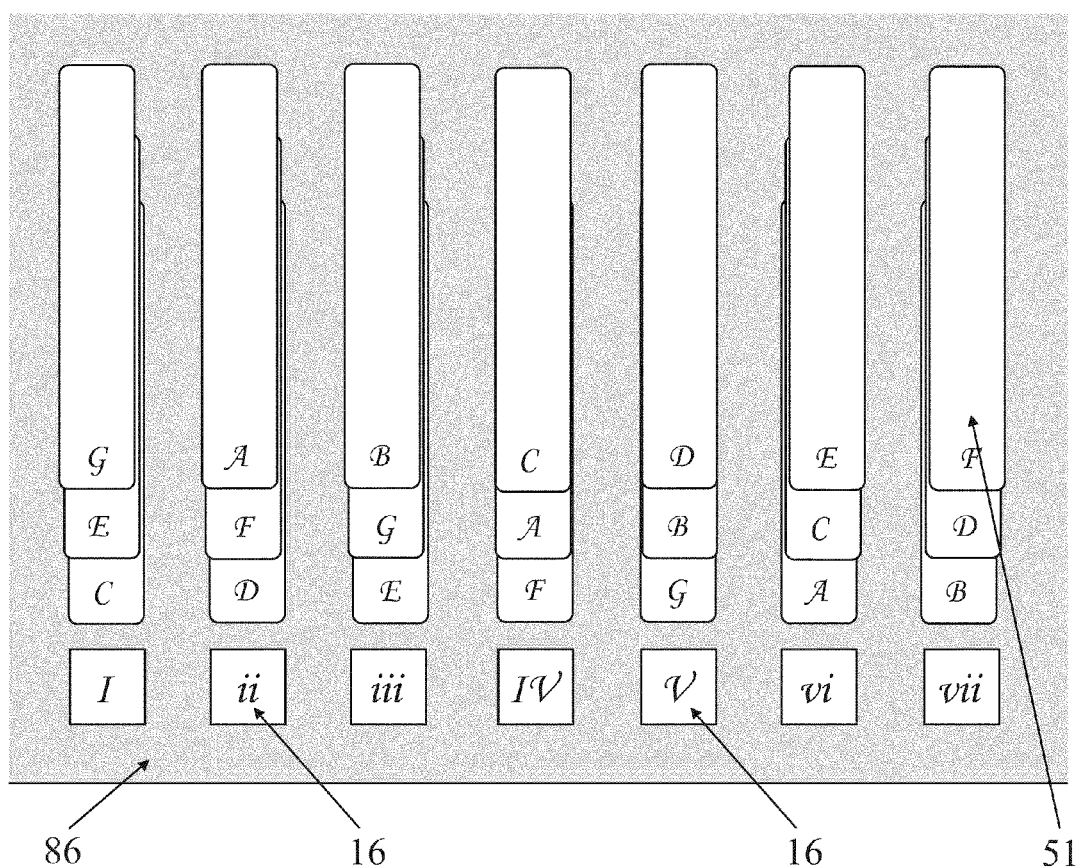
FIG. 11 is a perspective view of "Building the Seven Triads Exercise & Component," an example interactive musical instrument concept training component assembled from hands on manipulatives.

Building the Seven Triads Exercise & Component (FIG. 11): The user learns how to build major, minor, and diminished triads by using major and minor thirds in the process. First the user sets up the Grand Staff and the White and Black Keys on the green board (similar to Staff and Keys Exercise & Component). Then he builds major and minor thirds on the white keys by using the blue half step and whole step objects. Then on the gray board 86 he lays out the Roman Numeral blocks 16 in order as taught in the accompanying training manuals. Then by following the formula for major, minor, and diminished triads, as stated in the training manuals, he takes the white keys 51 from the green board and positions them above the seven Roman Numeral blocks 16 that he lined up on the gray board 86.

Figure 12:
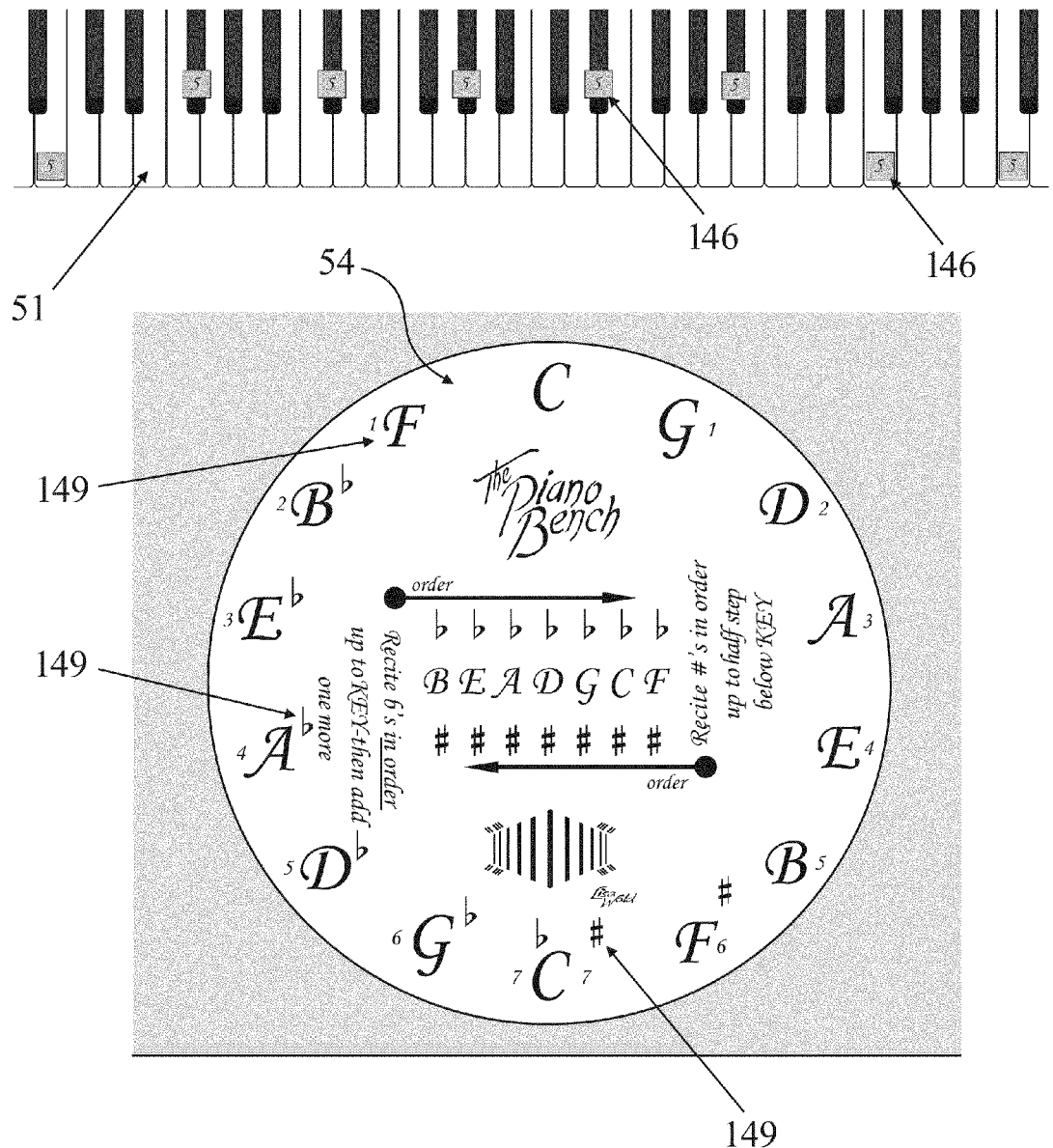
FIG. 12 is a perspective view of "Circle of Fifths Exercise & Component," an example interactive musical instrument concept training component assembled from hands on manipulatives.

Circle of Fifths Exercise & Component (FIG. 12): The user learns what the circle of fifths 54 is and how it is built by placing the red interval squares in fifths on the real piano. First he places a red interval square 146 on the lowest C. Then he takes seven more and places each one up a perfect fifth from the previous one. (A perfect fifth consists of 7 half steps). When he's done he'll see the white key 51 below each red interval square 146. Each white key 51 represents the same keys shown on the Circle of Fifths 54, which going clockwise adds one more sharp to the key signature for every ascending fifth. Then starting on the highest C on the piano the user places eight red interval squares on the keys a Perfect Fifth apart going down the keyboard. Every red interval square 146/key 51 represents a different "key" 149 on the Circle of Fifths 54 and adds one more flat to the key signature.

Order of Sharps and Flats Exercise & Component (FIG. 13): The user places sharp 19 or flat 22 rectangles on the Grand Staff set up on the green board 60 (similar to Staff and Keys Exercise & Component) in the particular order they are found in key signatures if all flats or sharps are present, thus learning the order of sharps and flats in key signatures found in musical notation.

Figure 14:
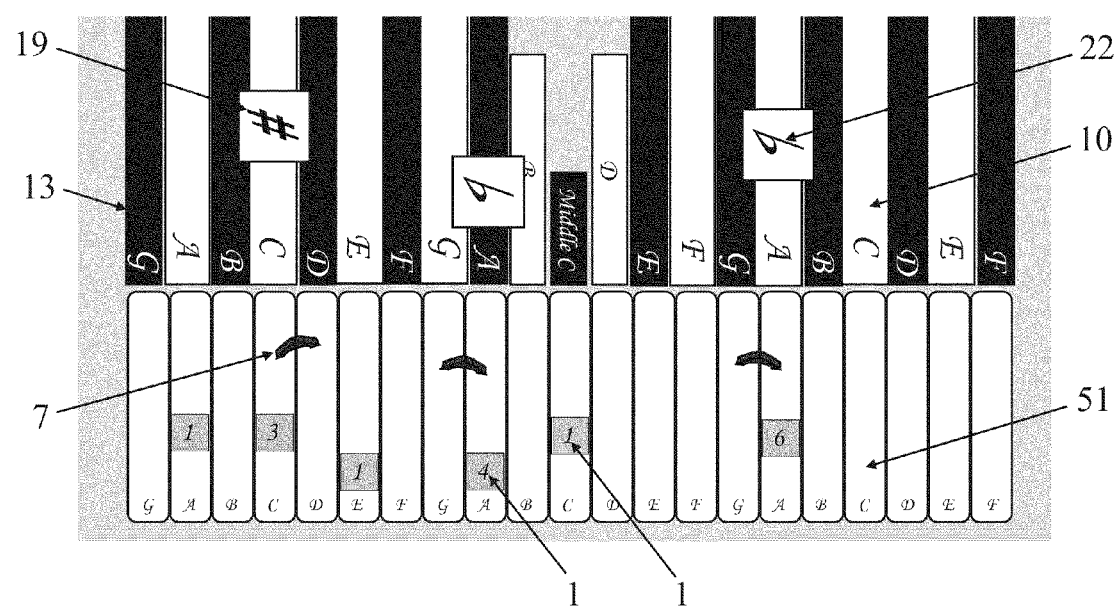
FIG. 14 is a perspective view of "Altering Intervals Exercise & Component," an example interactive musical instrument concept training component assembled from hands on manipulatives.

Altering Intervals Exercise & Component (FIG. 14): The user uses the interval squares 1, the sharp 19 and flat 22 blocks, and the blue half step 7 and whole step manipulatives to learn how to change intervals from major to minor. First he positions the Grand Staff and white keys on the green board (similar to Staff and Keys Exercise & Component). Then with the interval squares 1 he builds intervals on the keys 51 where they naturally occur within a major scale. Then he alters the intervals he just built by putting a blue half step 7 manipulatives where the change occurs. Then he puts a flat 22 or sharp 19 rectangle on the corresponding line 13 or space 10 on the Grand Staff that lines up with the altered key. Then he plays both the original and altered intervals on the real piano.

Figure 15:
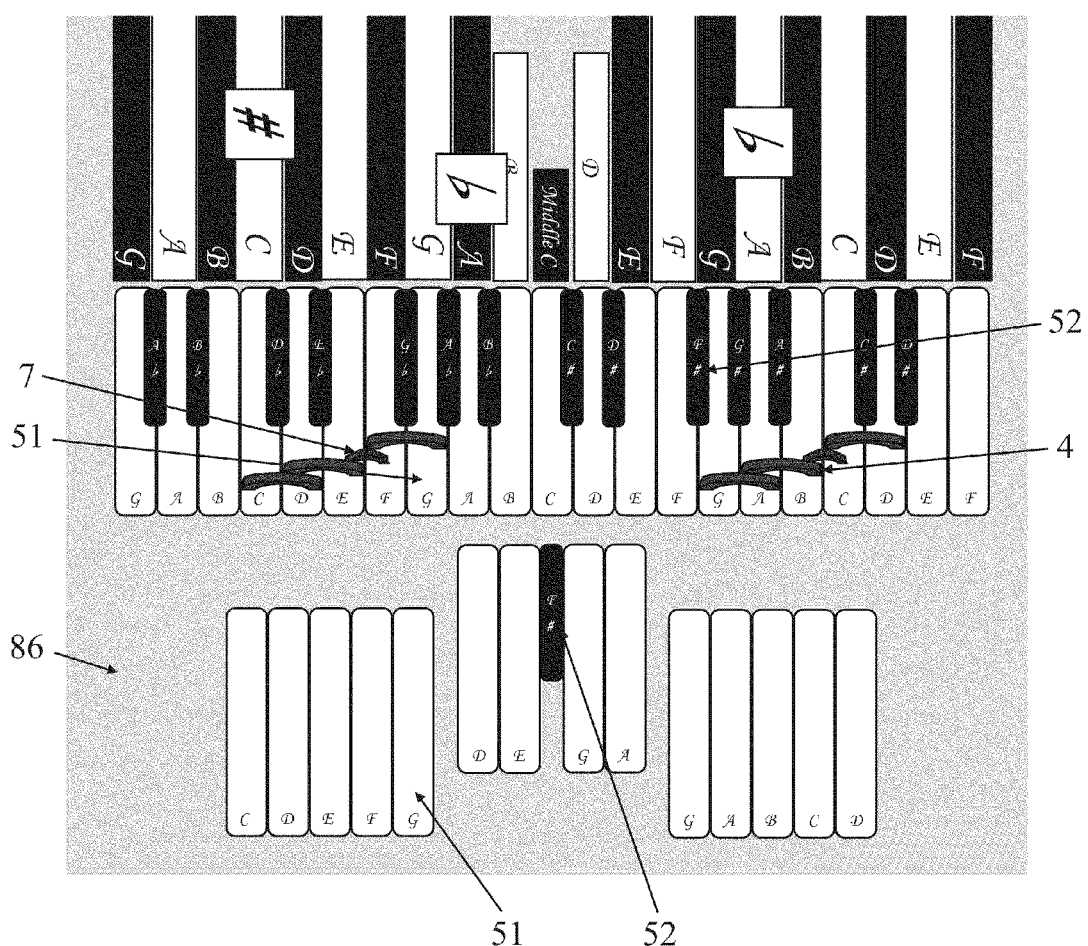
FIG. 15 is a perspective view of "Building Pentascales Exercise & Component," an example interactive musical instrument concept training component assembled from hands on manipulatives.

Building Pentascales Exercise & Component (FIG. 15): The user learns how to build Pentascales (five notes in a row which follow a whole, whole, half, whole step arrangement) in twelve different keys (four groups). First with the Grand Staff and Keys positioned and set up on the green board (similar to Staff and Keys Exercise & Component) the user places the blue half step 7 and whole step 4 manipulatives on the keys 51 which follow a pentascale pattern. Then on the gray board 86 the user lines up those same white 51 and black keys 52 he just built on the green board 60. By doing this he can visually see the white/black key pattern in each pentascale.

Figure 16:
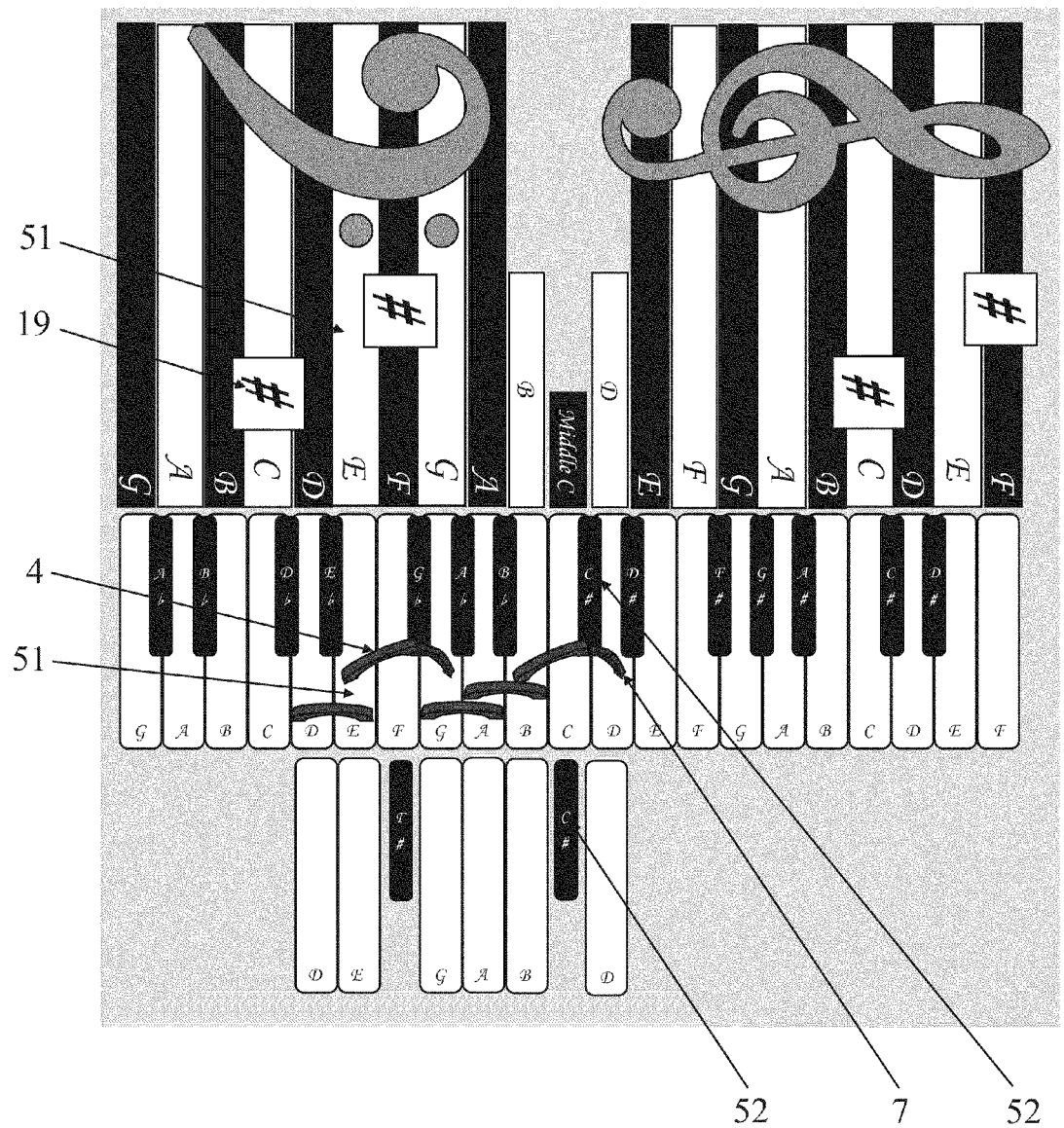
FIG. 16 is a perspective view of "Build Building Major Scales, Key Signatures, and Triads Exercise & Component," an example interactive musical instrument concept training component assembled from hands on manipulatives.

Building Major Scales, Key Signatures, and Triads Exercise & Component (FIG. 16): The user learns how to construct the scales, key signatures and seven triads in all of the twelve major keys. First he sets up the Grand Staff and Keyboard on the green board (similar to Staff and Keys Exercise & Component). Then he builds the scales, one at a time, by using the blue half step 7 and whole step 4 manipulatives to figure out the needed keys (by following the accompanying instructions in the training manuals). Then he takes those very white 51 and black keys 52 off the green board and lines them up on the gray board 86 to form each individual scale. Then he builds the key signatures of each major key on the Grand Staff using the sharp 19 and flat (not shown—22) rectangles for the keys that he sees in the scale he just constructed. Then he builds the triads for each scale of the Roman Numerals as he did in the "Triad Building Exercise & Component."

Figure 17:
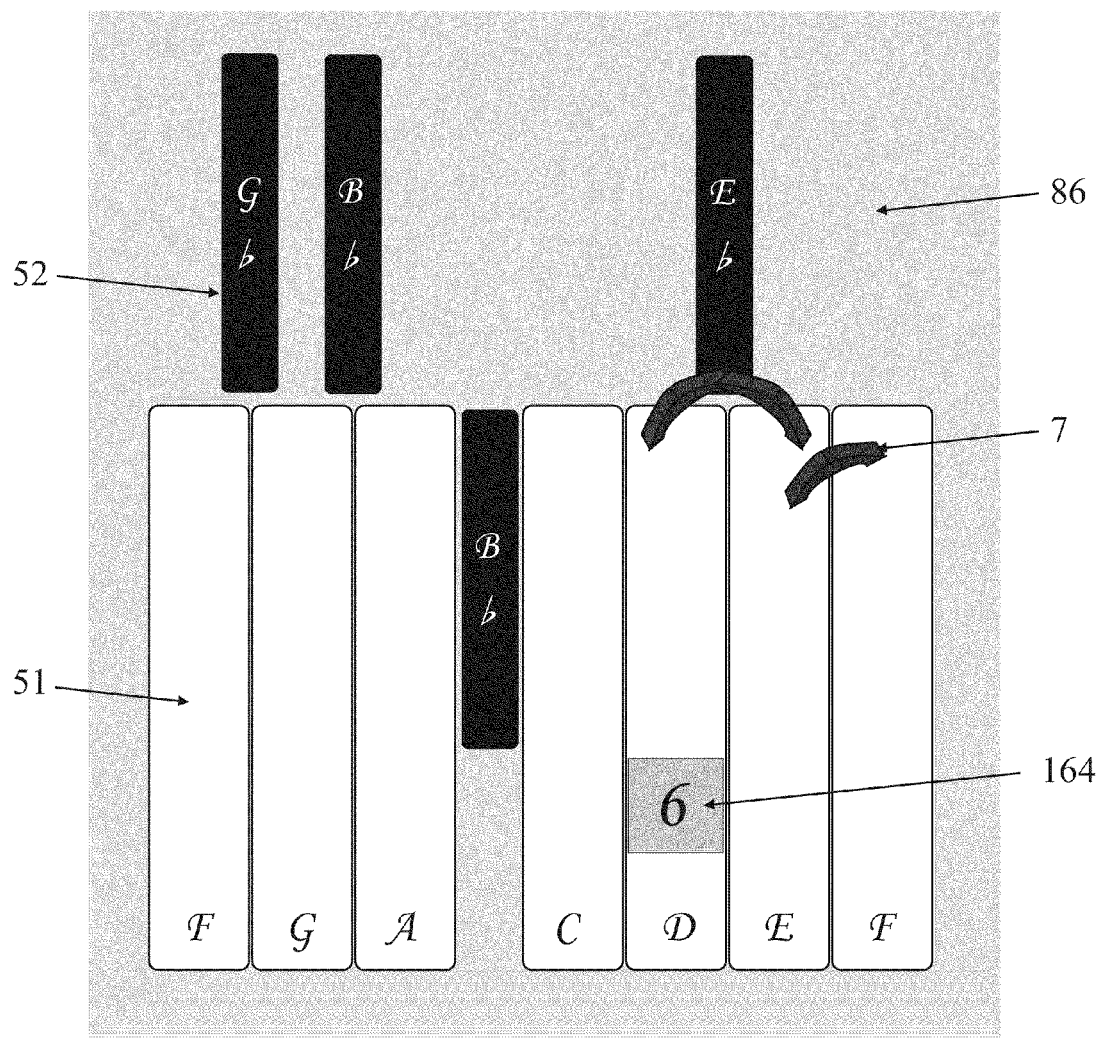
FIG. 17 is a perspective view of "Finding the Relative Minor Exercise & Component," an example interactive musical instrument concept training component assembled from hands on manipulatives.

Finding the Relative Minor Exercise & Component (FIG. 17): The user uses brown interval squares 164, blue half step 7 manipulatives and white 51 and black keys 52 on the gray board 86 to form major scale patterns and then find the twelve relative minor keys for each of the twelve major keys. First the user builds the major scales. Then he places the brown interval square 164 (with a number 6) on the sixth scale degree. He also places the blue half step 7 on the key three half step keys below the tonic (bottom and top note of the scale). By doing this he can then see that the blue half step 7 and brown interval square 164 are on the same key, which is the relative minor. He has then learned two different ways to find the relative minor key of a major key.

Building Minor Scales Exercise & Component (FIG. 18): The user learns how to build minor scales. Based on the minor key signatures, the user constructs all twelve minor scales using the white 51 and black keys 52, and the sharp (not shown—19)/flat 22/natural (not shown—25) rectangles. First, on the gray board 86 the user lines up the white 51 or black keys 52, sharps, flats 22, or naturals that belong to each scale. Then the user builds the key signatures on the Grand Staff which is set up on the green board.

Building Seven Minor Triads Exercise & Component: The user builds minor triads in the same way as he built major triads. By turning the major Roman Numeral rectangles over they become minor Roman Numeral rectangles. The user follows the formula for building minor triads.

Figure 19:
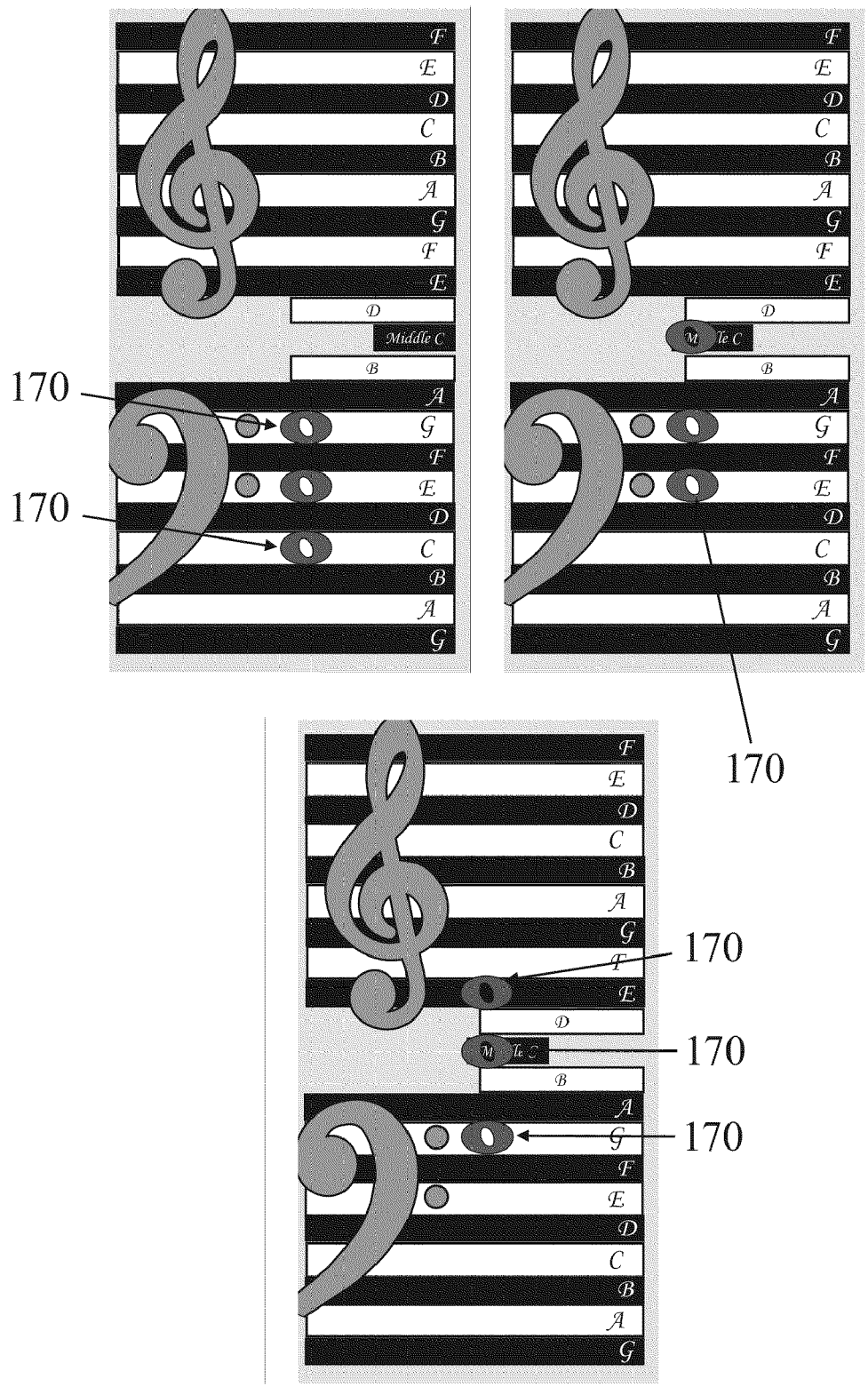
FIG. 19 is a perspective view of "Building Inversions Exercise & Component," an example interactive musical instrument concept training component assembled from hands on manipulatives.

Building Inversions Exercise & Component (FIG. 19): The user places the rhythmic whole note pieces on the Grand Staff that is set up on the gray board. First he places three whole notes 170 in a root position triad position (with the tonic on the bottom, or in the lowest position). Then he moves the bottom (lowest called the tonic) one up one octave higher (thus forming a first inversion triad). Then he moves the lowest note in the first inversion position an octave higher (thus forming a second inversion triad). By doing this the user learns how to build triads and invert them on the staff.

Metronome Fingers and Ball Exercises & Components: The user learns how to count and understand the dotted quarter and eighth note rhythm. Using the ball and the metronome set at 50 the user bounces the ball to the beat saying "bounce" the first time the ball bounces, "dot" the second time the ball bounces, and "and" when he catches the ball after the second bounce. He keeps doing this over and over until it's easy. Then using the different rhythm cards he builds different rhythms on the rhythm mat. Then he claps and says words to the rhythms he created while following the metronome as he did with the ball.

Metronome Ball Exercise & Component: In an example of a coordination practicing exercise and component, the user, bouncing a ball in time with a metronome, learns to coordinate muscular movements and words (with the same number of syllables as the rhythm) with musical timing. The user learns how to count and understand complicated syncopation rhythms. The user holds the ball when the tick of the metronome sounds. Then he bounces the ball in between the ticks. Next the user taps his foot to the metronome tick saying "down" when his toes touch the ground and "up" when his toes are up off the ground. Then as he continues tapping his foot to the metronome ticking he claps when he says "up", and keeps his hands together when he says "down". By doing this he learns to listen to and feel the beat. He also learns how to play the note in between beats. Then the user builds different rhythms on the green board with the various rhythm pieces. Then he claps or bounces the ball while saying the words that match the various rhythms to the metronome ticking.

Composition Exercise & Component: The user uses all the pieces in the rhythm packets (rhythm pieces, time signatures, ties, staccatos, and bar lines) to build twelve measures of rhythms on the gray board.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. An instructional kit for assisting a user of said kit to learn to read music for playing a musical instrument, by means of first learning to count different existing rhythms, said kit providing means for said user to compose and play music before reading music: said kit comprising:
   a. a container, having within the container;
   b. a set of hands on manipulatives, which embeds tactile importance in learning style, wherein said set of hands on manipulatives: are pieces of two different colors and are dimensionally proportionate to one another; said pieces are directly related to a note value and a time signature; said pieces having imprinted notes and assemble into a structured system said structure system represents between one to four beats in length and are dependent on said imprinted notes; and whereas one specific measurement represents one beat of musical time of interactive musical instrument concept training; said kit further comprising components corresponding to a set of prepared exercises in at least one or more training manuals;
   c. wherein said kit employs said user to first build music on some type of game board with the hands on manipulatives away from the musical instrument.

2. An instructional kit for assisting a user of the kit to learn to play a musical instrument according to claim 1 additionally comprising said at least one or more training manuals.

3. An instruction kit for assisting a user of the kit to learn to play a musical instrument according to claim 1 wherein said prepared exercises are contained in three training manuals.

4. An instructional kit for assisting a user of the kit in learning to play a musical instrument as claimed in claim 1, wherein the instrument is a piano.

5. An instructional kit for assisting a user of the kit to learn to play a musical instrument according to claim 1 wherein said set of hands on manipulatives are selected from one or more of the group comprising pieces representing music principles of musical notation, pieces representing parts of the musical instrument to which the kit applies, and pieces for training coordination of the mental and physical processes required to translate musical notation into music when reading musical notation and manipulating the musical instrument.

6. An instructional kit for assisting a user of the kit in learning to read music and learn to play a musical instrument according to claim 5, wherein said set of hands on manipulatives include at least one piece selected from the group comprising: a white piano key replica, a black piano key replica, an interval square, a musical whole step replica, a musical half step replica, a musical staff space and line, a roman numeral block, a block imprinted with a musical sharp, flat or natural sign, a block imprinted with a musical time signature, a black bar line, a musical repeat sign, a circle of fifths, a rhythm card, a musical note, a game board, a racquet ball, a set of white gloves, a musical clef, a black beam, a staccato replica and a musical tie replica.

7. An instructional kit for assisting a user of the kit in learning to read music according to claim 1, wherein said interactive musical instrument concept training components are selected from one or more of the group comprising:
   1. composing music as a prerequisite to reading music,
   2. building both the abstract and concrete musical concepts away from the piano on a game board is a prerequisite to reading music,
   3. counting rhythms as a prerequisite to reading music: said kit further providing practicing of coordination components which encompass rhythm, ball, and metronome components and wherein when said ball bounces when a beat begins, said ball is caught exactly half way between down-beats, and wherein rhythm words are used while counting rhythms in said manuals; said manuals correspond to both down beats and up beats of said bouncing ball; said ball is caught while said metronome is ticking.

8. An instructional kit for assisting a user of the kit in learning to play a musical instrument according to claim 7, wherein said interactive musical instrument concept training components are selected from one or more of the group comprising: "Building the Piano Keys Component," "Gloves Component," "Colorful Keys Component," "Stepping and Skipping Component," "Rhythm Building Component," "Staff and Keys Component," "Playing with Intervals Component," "Half Steps and Whole Steps Component," "Sharps and Flats Component," "Triad Building Component," "Building the Seven Triads Component," "Circle of Fifths Component," "Order of Sharps and Flats Component," "Altering Intervals Component," "Building Pentascales Component," "Building Major Scales, Key Signatures and Triads Component," "Finding the Relative Minor Component," "Building Minor Scales Component," "Building Seven Minor Triads Component," "Building Inversions Component," "Metronome Ball Exercise Component," "Metronome Fingers and Ball Exercise Component," and "Composition Component."

9. A method of learning to play a musical instrument, comprising the steps of:
  a. employing a kit having a set of hands on manipulatives, wherein said set of hands on manipulatives assemble into a structured system of interactive musical instrument concept training components according to exercises set forth in at least one or more training manuals,
  b. completing individual exercises set forth in said at least one or more training manuals to assemble a portion of said set of hands on manipulatives into said interactive musical instrument concept training components; and,
  c. as needed, repeating the step of completing individual exercises set forth in said training manual until said structured system of interactive musical instrument concept training components is completed.

10. The method of teaching a musical instrument to a user according to claim 9, wherein said steps of completing individual exercises set forth in said at least one or more training manuals to assemble a portion of said set of hands on manipulatives into interactive musical instrument concept training components and repeating are employed to simultaneously instruct the user in various principles of playing the instrument according to one or more steps selected from the group comprising composing; counting; playing the keys; and after those are mastered then reading the music.

11. The method of claim 9 wherein the instrument is a piano.

12. The method of claim 9 wherein said step of completing individual exercises set forth in said at least one or more training manuals to assemble a portion of said set of hands on manipulatives into interactive musical instrument concept training components simultaneously serves to:
  a. train said user to create, notate and play a piece of music without reading music using mechanisms other than a traditional staff,
  b. train the user to count musical rhythm notation and recognize the temporal relation between said musical rhythm notation and length of time to play a note on the musical instrument,
  c. learn to associate a musical staff using lines, spaces, and clefs with musical instrument components resulting in teaching said user to sight read musical notation explained in said training manuals using kit components,
  d. train the user to understand how scales and intervals are built and recognize sharps and flats on a musical scale,
  e. train the user to understand how intervals and chords are built,
  f. train the user to be able to identify a particular sound with a particular interval and anticipate what sound will be next without needing to hear said next sound first; and;
  g. train the user to create, notate and play a piece of music.

13. The method of claim 12 wherein the musical instrument is a piano and said step of completing the individual exercises set forth in said at least one or more training manuals to assemble a portion of said set of hands on manipulatives into interactive musical instrument concept training components that simultaneously serves to teach a user of the method to sight read musical notation and associate the musical notation with parts of the musical instrument includes one or more of the exercises set forth in the group comprising: "Building the Piano Keys," "Gloves," "Colorful Keys," "Stepping and Skipping," "Rhythm Building," "Staff and Keys," "Playing with Intervals," "Half Steps and Whole Steps," "Sharps and Flats," "Triad Building," "Building the Seven Triads," "Circle of Fifths," "Order of Sharps and Flats," "Altering Intervals," "Building Pentascales," "Building Major Scales, Key Signatures and Triads," "Finding the Relative Minor," "Building Minor Scales," "Building Seven Minor Triads," "Building Inversions," "Metronome Ball Exercise," "Metronome Fingers and Ball Exercise," and "Composition."

14. The method of claim 12 wherein the musical instrument is a piano and said step of completing the individual exercises set forth in said at least one or more training manuals to assemble a portion of said set of hands on manipulatives into interactive musical instrument concept training components that simultaneously serves to train the user to count musical rhythm notation and recognize the temporal relation between said musical rhythm notation and length of time to play a note on the musical instrument includes one or more of the exercises set forth in the group comprising: "Rhythm Building," "Metronome Ball Exercise," "Metronome Fingers and Ball Exercise," and "Composition."

15. The method of claim 12 wherein the musical instrument is a piano and said step of completing the individual exercises set forth in said at least one or more training manuals to assemble a portion of said set of hands on manipulatives into interactive musical instrument concept training components that simultaneously serves to train the user to understand how scales and intervals are built and recognize sharps and flats on a musical scale includes one or more of the exercises set forth in the group comprising: "Stepping and Skipping," "Playing with Intervals," "Half Steps and Whole Steps," "Sharps and Flats," "Circle of Fifths," "Order of Sharps and Flats," "Altering Intervals," "Building Pentascales," "Building Major Scales, Key Signatures and Triads," "Finding the Relative Minor," "Building Minor Scales," "Building Seven Minor Triads," "Building Inversions," and "Composition."

16. The method of claim 12 wherein the musical instrument is a piano and said step of completing the individual exercises set forth in said at least one or more training manuals to assemble a portion of said set of hands on manipulatives into interactive musical instrument concept training components that simultaneously serves to train the user to understand how intervals and chords are built includes one or more of the exercises set forth in the group comprising: "Stepping and Skipping," "Staff and Keys," "Playing with Intervals," "Half Steps and Whole Steps," "Sharps and Flats," "Triad Building," "Building the Seven Triads," "Circle of Fifths," "Order of Sharps and Flats," "Altering Intervals," "Building Pentascales," "Building Major Scales, Key Signatures and Triads," "Finding the Relative Minor," "Building Minor Scales," "Building Seven Minor Triads," "Building Inversions," and "Composition."

17. The method of claim 12 wherein the musical instrument is a piano and said step of completing the individual exercises set forth in said at least one or more training manuals to assemble a portion of said set of hands on manipulatives into interactive musical instrument concept training components that simultaneously serves to train the user to be able to identify a particular sound with a particular interval and anticipate what sound will be next without needing to hear said next sound first includes one or more of the exercises set forth in the group comprising: "Stepping and Skipping," "Rhythm Building," "Playing with Intervals," "Half Steps and Whole Steps," "Sharps and Flats," "Circle of Fifths," "Order of Sharps and Flats," "Altering Intervals," "Building Pentascales," "Building Major Scales, Key Signatures and Triads," "Finding the Relative Minor," "Building Minor Scales," "Building Seven Minor Triads," "Building Inversions," "Metronome Ball Exercise," "Metronome Fingers and Ball Exercise," and "Composition."

18. The method of claim 12 wherein the musical instrument is a piano and said step of completing the individual exercises set forth in said at least one or more training manuals to assemble a portion of said set of hands on manipulatives into interactive musical instrument concept training components that simultaneously serves to train the user to create and notate a piece of music includes one or more of the exercises set forth in the group comprising: "Stepping and Skipping," "Rhythm Building," "Staff and Keys," "Playing with Intervals," "Half Steps and Whole Steps," "Sharps and Flats," "Triad Building," "Building the Seven Triads," "Circle of Fifths," "Order of Sharps and Flats," "Altering Intervals," "Building Pentascales," "Building Major Scales, Key Signatures and Triads," "Finding the Relative Minor," "Building Minor Scales," "Building Seven Minor Triads," "Building Inversions," "Metronome Ball Exercise," "Metronome Fingers and Ball Exercise," and "Composition."

* * * * *